(12) United States Patent
Aulick

(10) Patent No.: US 7,484,789 B1
(45) Date of Patent: Feb. 3, 2009

(54) RETRACTABLE TARP COVER SYSTEM FOR TRUCK OR TRAILER BODIES

(76) Inventor: Vinc L. Aulick, 730 Avenue "I", Scottsbluff, NE (US) 69361

( * ) Notice: Subject to any disclaimer, the term of this patent is extended or adjusted under 35 U.S.C. 154(b) by 84 days.

(21) Appl. No.: 11/803,314

(22) Filed: May 14, 2007

(51) Int. Cl.
 *B60P 7/02* (2006.01)
(52) U.S. Cl. .............. 296/100.11; 296/100.01; 296/100.17; 296/100.18
(58) Field of Classification Search ........ 296/100.01, 296/100.11, 100.12, 100.13, 100.14, 100.17, 296/100.18
See application file for complete search history.

(56) References Cited

U.S. PATENT DOCUMENTS

| | | | |
|---|---|---|---|
| 3,942,830 A | 3/1976 | Woodard | |
| 5,102,182 A | 4/1992 | Haddad, Jr. | |
| 5,938,270 A | 8/1999 | Swanson et al. | |
| 6,142,554 A | 11/2000 | Carroll et al. | |
| 6,481,779 B1 | 11/2002 | Gothier et al. | |
| 6,582,007 B2 | 6/2003 | Gothier et al. | |
| 6,695,383 B2 * | 2/2004 | Wood ................... | 296/98 |

* cited by examiner

*Primary Examiner*—Lori L Lyjak
(74) *Attorney, Agent, or Firm*—Dennis L. Thomte; Thomte Patent Law Office

(57) ABSTRACT

A retractable tarp cover for a truck body is adapted to be moved from a retracted position at the front of the truck body to an extended position at the rear of the truck body through the use of one more hydraulic motors which move the assembly along a pair of tracks which are secured to the upper ends of the side walls of the truck body.

10 Claims, 5 Drawing Sheets

RETRACTABLE TARP COVER SYSTEM FOR TRUCK OR TRAILER BODIES

BACKGROUND OF THE INVENTION

1. Field of the Invention

This invention relates to a retractable tarp cover system for an elongated truck or trailer body and more particularly to a retractable tarp cover system for truck or trailer bodies which is moved between its retracted to extended positions and vice versa by means of a hydraulic motor driven assembly.

2. Description of the Related Art

For many years, flexible tarps have been used to cover the tops of truck or trailer bodies. In the earliest days, the flexible tarp was extended over the upper end of the truck body with the front, rear and side edges thereof being secured to the body by ropes or the like. In recent years, many different types of tarp cover systems have been provided for positioning and securing a flexible tarp over the upper end of a truck or trailer body. For example, see U.S. Pat. Nos. 3,942,830; 5,102,182; 5,938,270; 6,142,554; 6,481,779; and 6,582,007.

It is believed that each of the prior art systems suffers from certain disadvantages or shortcomings. For example, in the crank operated tarp systems, the manual cranking of the tarp from its retracted to extended positions and vice versa could be a strenuous task. In the cable systems, many component parts were required with occasional failures of the pulleys, cables, etc. In the electrically operated cable systems, the pulleys, cables, etc., could fail.

SUMMARY OF THE INVENTION

A retractable tarp cover system for a truck or trailer body or box having front and rear ends and first and second sides having upper ends is disclosed. The system comprises a first elongated track member which is secured to the upper end of the first side of the truck body which extends between the front and rear ends thereof. A second elongated track member is secured to the upper end of the second side of the truck body which extends between the front and rear ends thereof. A transversely extending support, in the form of a truss or box beam truss, having first and second ends, is positioned between the first and second track members and extends therebetween. A first reversible hydraulic motor is operatively secured to the first end of the support and has a first driven gear in operative engagement with the first track member. A second reversible hydraulic motor is operatively secured to the second end of the support and has a second driven gear in operative engagement with the second track member.

A plurality of transversely extending and spaced-apart tarp bows, having first and second ends, are also provided. The first ends of tarp bows are operatively horizontally movably mounted on the upper end of the first side of the truck body in a forwardly and rearwardly direction with respect thereto. The second ends of the tarp bows are operatively horizontally movably mounted on the upper end of the second side of the truck body in a forwardly and rearwardly direction with respect thereto.

A flexible tarp, having a front end, a rear end, and first and second sides, is provided with the front end of the tarp being fixed in position at the front end of the truck body. The rear end of the tarp is secured to the support for movement therewith. The tarp is secured to the tarp bows and extends between the upper ends of the first and second sides of the truck body. The first and second reversible hydraulic motors, when operated in a first rotational direction, cause the first and second driven gears to rotate in a first direction with respect to the first and second tracks to cause the support to move forwardly along the first and second tracks thereby causing the tarp to retract towards the front end of the truck body. The first and second reversible hydraulic motors, when operated in a second direction opposite to the first direction, with the tarp being in a retracted position, cause the first and second gears to rotate in a second direction opposite to the first direction with respect to the first and second tracks to cause the support to move rearwardly along the first and second tracks thereby causing the tarp to be extended to the rear end of the truck body.

It is therefore a principal object of the invention to provide an improved retractable tarp cover system for a truck or trailer body.

A further object of the invention is to provide an improved retractable tarp cover system for a truck or trailer body wherein the tarp is moved between its extended and retracted positions and vice versa by means of at least one hydraulic motor, and preferably two hydraulic motors.

Still another object of the invention is to provide a retractable tarp cover system for a truck or trailer body which eliminates the need for manually positioning the tarp over the truck or trailer body.

Still another object of the invention is to provide a retractable tarp cover system for a truck or trailer body which has a reduced number of movable parts.

Yet another object of the invention is to provide a retractable tarp cover system for a truck or trailer body which may be attached to a conventional truck or trailer body without extensive modification thereof.

These and other objects will be apparent to those skilled in the art.

DETAILED DESCRIPTION OF THE INVENTION

Figure 1:
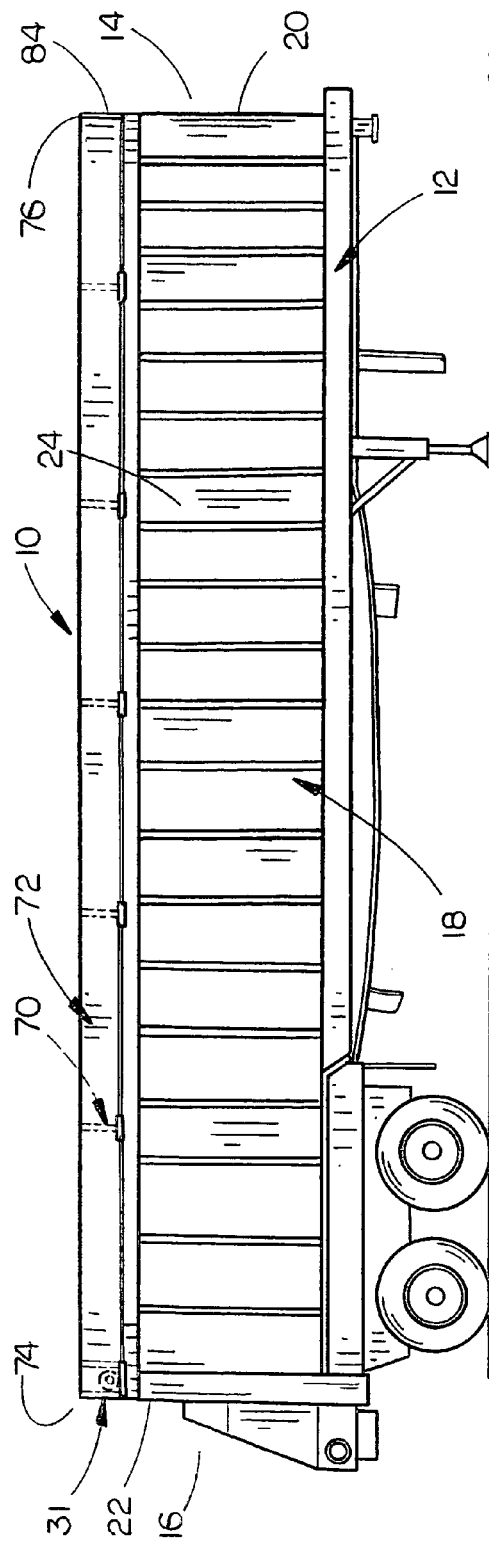
FIG. 1 is a side view of a trailer having the tarp cover system of this invention mounted thereon with the tarp cover being in its extended position.

FIG. 1 illustrates a conventional trailer such as manufactured by Aulick Industries of Scottsbluff, Nebr., which is illustrated by the reference numeral 10. Although a trailer is illustrated, the invention described herein will work equally well with a straight truck body or any other type of container.

Trailer 10 includes a wheeled frame means 12 having a forward end 14, rear end 16 and body or box 18 mounted thereon. Body 18 includes a front wall 20, back wall 22, opposite side walls 24 and 26, each of which has upper ends to define an open upper end. The truck or trailer body 18 also includes a conventional source of hydraulic fluid under pressure which would normally be supplied by the prime mover.

Each of the upper ends of the side walls 24 and 26 will normally have reinforcing structures or beams 28 and 30 provided thereon, but the same is not found in all prior art truck or trailer bodies.

Figure 3:
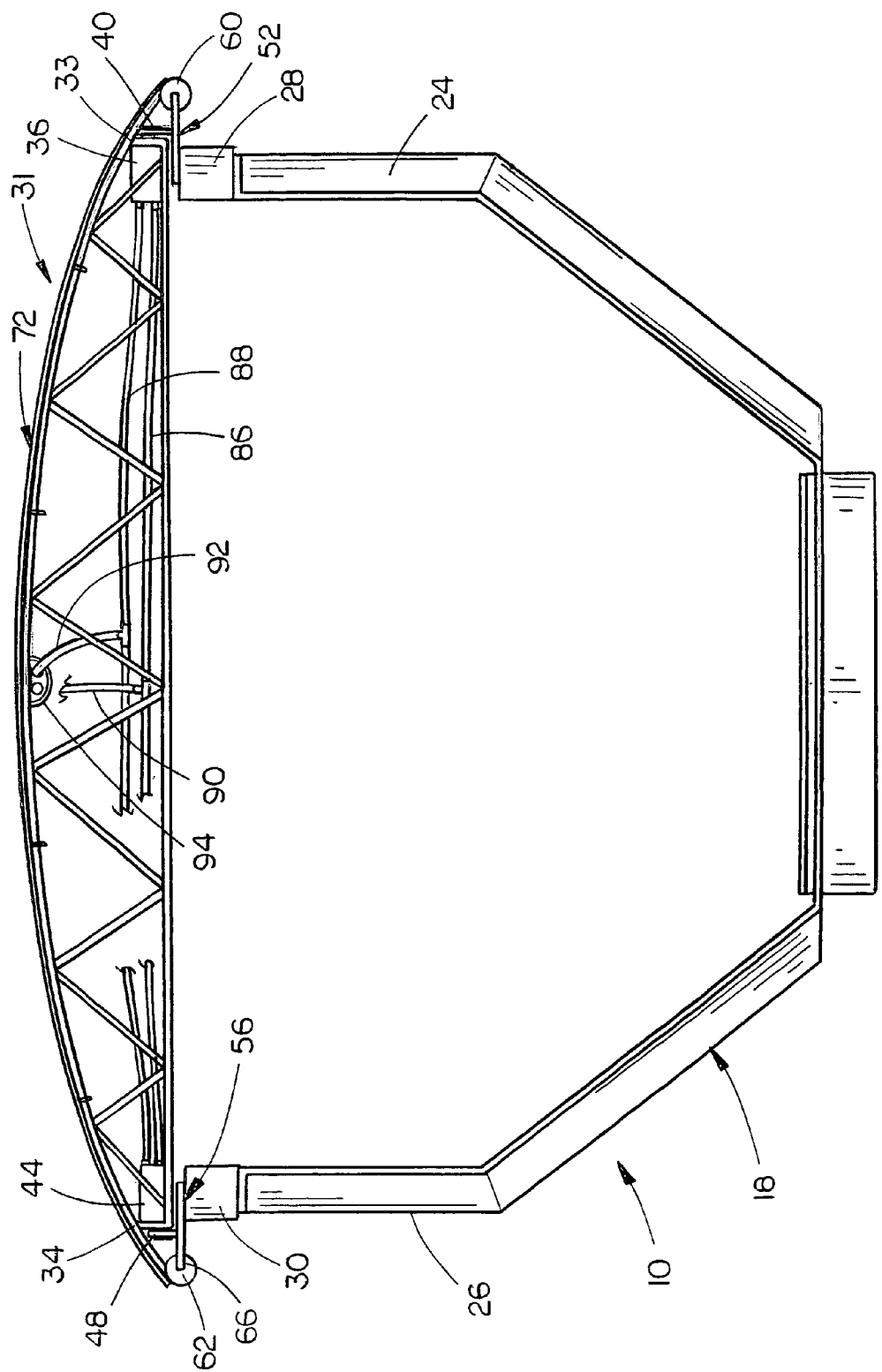
FIG. 3 is a rear view of the trailer of FIG. 1 with portions thereof cut away to more fully illustrate the invention.
Figure 4:
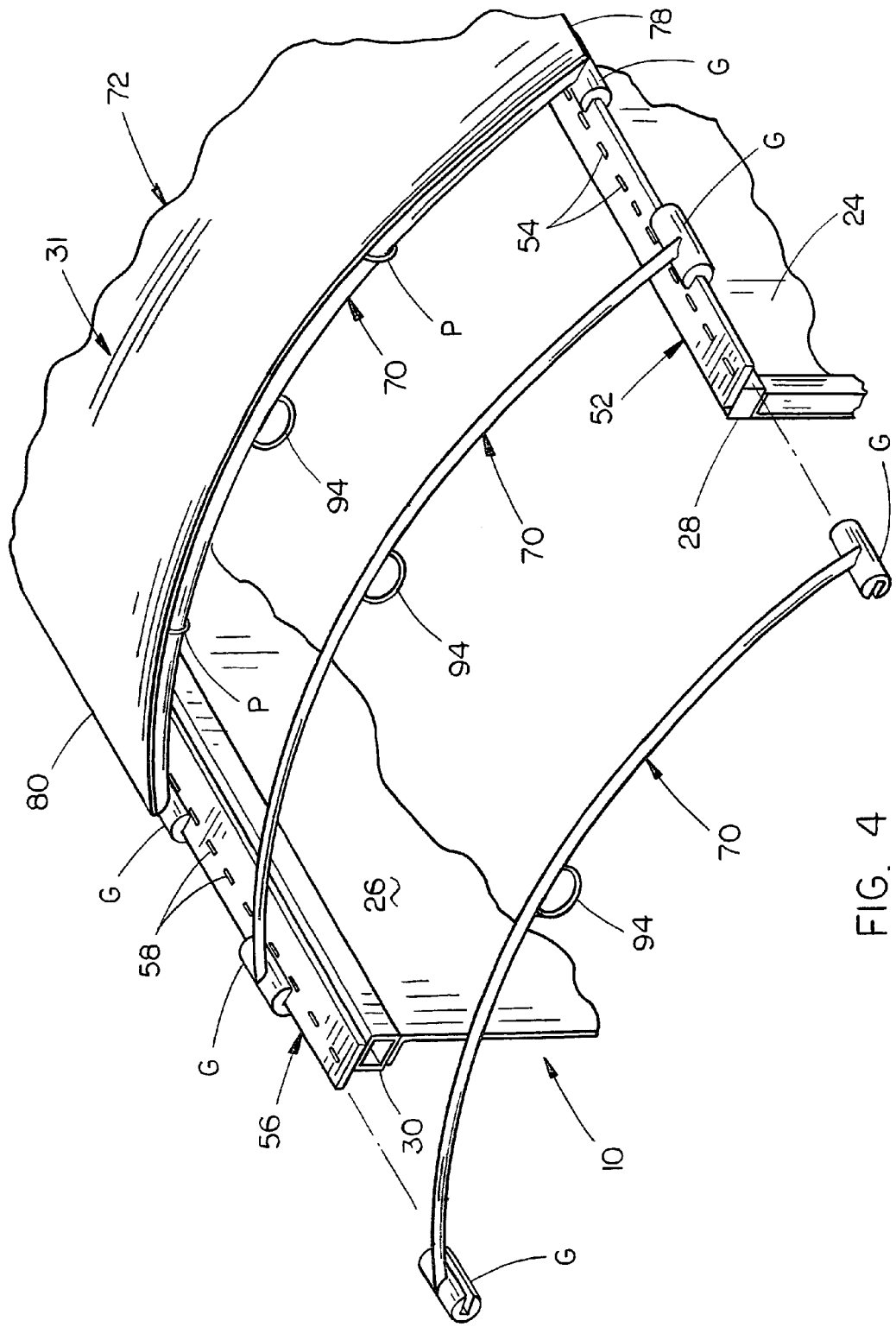
FIG. 4 is a partial rear exploded perspective view of the tarp cover system of this invention.
Figure 5:
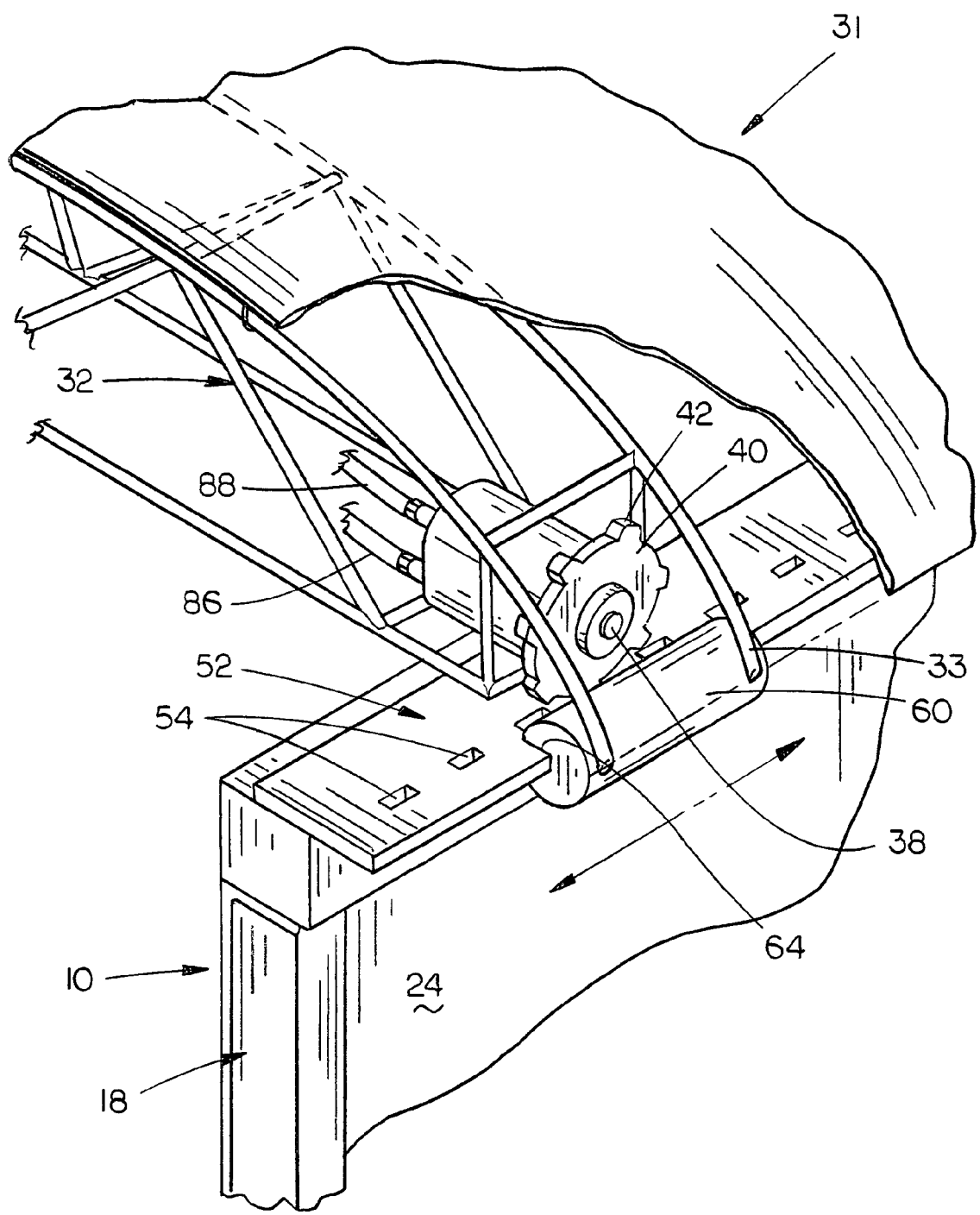
FIG. 5 is a partial rear exploded perspective view of the tarp cover system of this invention.
Figure 6:
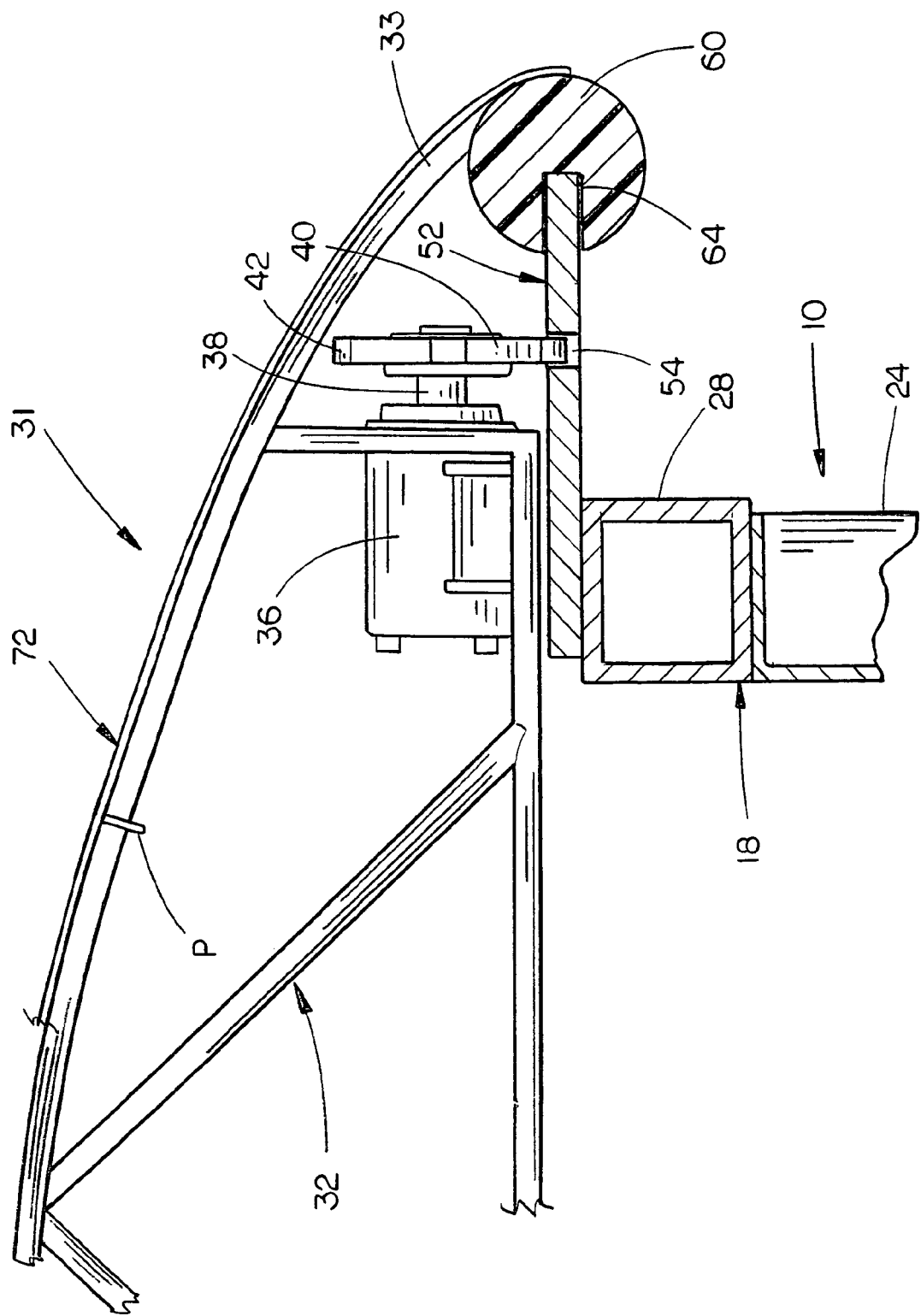
FIG. 6 is a partial sectional view of the tarp cover system of this invention.

The retractable tarp cover system of this invention is referred to generally by the reference numeral 31 as will now be described. The numeral 32 refers to a support which may be in the form of a truss or box beam having an upper surface which is curved or bowed, as illustrated in FIG. 3. Support 32 includes a first end 33 and a second end 34.

A first reversible hydraulic motor 36 is operatively secured to the end 33 of support 30 by any convenient means. Hydraulic motor 36 has a driven shaft 38 extending therefrom which extending therefrom which has a gear or sprocket 40 mounted thereon for rotation therewith which has a plurality of teeth 42 extending therefrom.

A second hydraulic motor 44 is operatively secured to the second end 34 of support 30 by any convenient means and has a power or driven shaft identical to shaft 38 extending outwardly therefrom which has a gear or sprocket 48 mounted thereon for rotation therewith which has teeth extending therefrom identical to teeth 42.

The numeral 52 refers to an elongated track or rack which is secured to the upper end of the side wall 24 or the beam 28 if a beam 28 is utilized, and which extends between the front and rear ends of the side wall 24. Track 52 has a plurality of spaced-apart openings 54 formed therein which are adapted to receive the teeth 42 therein. The numeral 56 refers to a second track or rack which is secured to the upper end of wall 26 or the beam 30 if beam 30 is utilized and which has openings 58 formed therein.

The first and second ends of support 31 are slidably secured to the outer edges of tracks 52 and 56 by means of guides 60 and 62, respectively. Guides 60 and 62 are secured to the ends 33 and 34 of support 30, respectively, by any convenient means and have inwardly extending U-shaped channels or slots 64 and 66 formed therein, respectively, which slidably receive the outer edges of tracks 52 and 56, respectively. The engagement of the guides 60 and 62 with respect to the tracks 52 and 56, respectively, limits the vertical movement of the support 30 with respect to the side walls of the truck body.

The numerals 70 refer to a plurality of inverted U-shaped tarp bows which have guides G secured to the outer ends thereof which are slidably secured to the outer side edges of the tracks 52 and 56, respectively, in the same manner as the guides 60 and 62 are secured to the tracks 52 and 56. The guides G not only maintain the bows 70 in their upright conditions, but also permit the bows 70 to slidably move along the tracks 52 and 56.

The numeral 72 refers to a conventional flexible tarp having a rear end 74, front end 76, and opposite sides 78 and 80. The rear end 74 of tarp 72 is secured to the rearward end of support 30 by any convenient means. Each of the bows 70 are secured to the tarp 72 by means of the bows extending through straps or pockets P formed on the underside of the tarp 72. The front end 76 of tarp 72 is secured to the front end of the box and will usually be positioned adjacent and upstanding shield or plate 84.

Hydraulic hose 86 is connected to motors 36 and 44 and extend therebetween. Hydraulic hose 88 is connected to motors 36 and 44 and also extends therebetween. Hoses 86 and 88 are connected to hoses 90 and 92, respectively, which extend forwardly therefrom for connection to the source of hydraulic fluid under pressure. Hoses 90 and 92 extend forwardly from hoses 86 and 88 through loops or straps 94 secured to bows 70.

Figure 2:
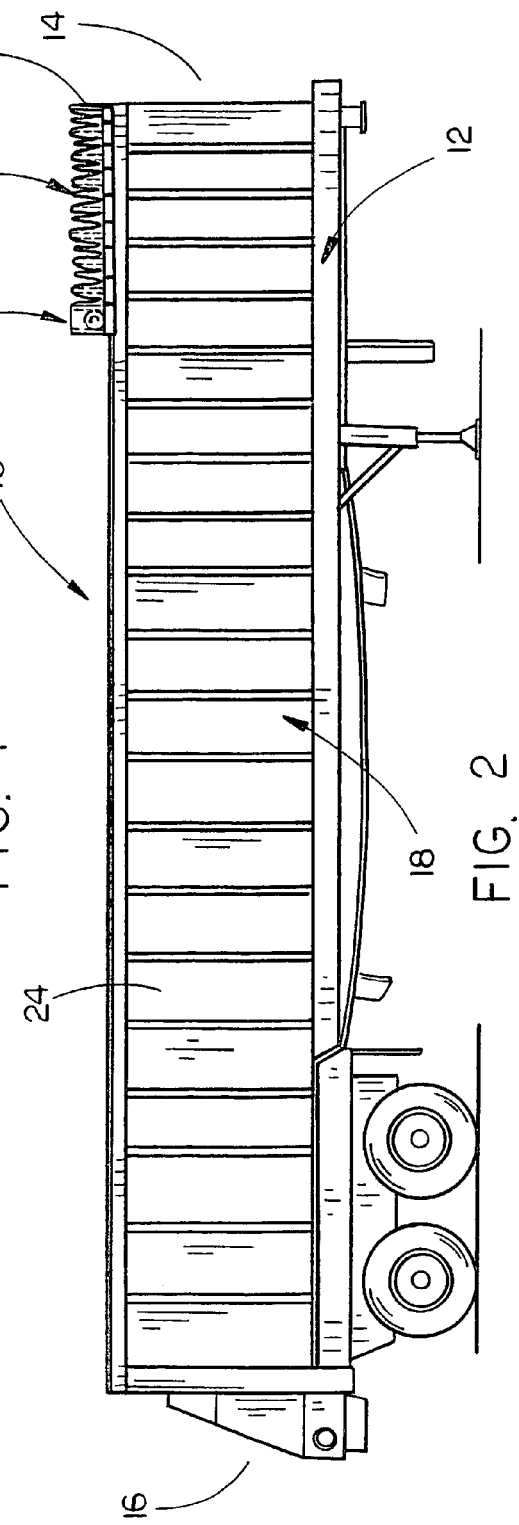
FIG. 2 is a side view of the trailer of FIG. 1 with the tarp cover in a retracted position.

In operation, assuming that the tarp is in its retracted position at the front end of the body 18 adjacent the shield 84, as seen in FIG. 2, and it is desired to extend the tarp 72 over the upper end of the body 18, the hydraulic motors 36 and 44 are activated to cause the rotation of the gears 40 and 48. As the gears 40 and 48 are rotated, the teeth 42 on gear 40 and the teeth on gear 48 will successively be received within the openings 54 and 58, respectively, which will cause the support 31 to be moved rearwardly along the tracks 52 and 56. As the support 31 is moved rearwardly, it will tend to straighten the tarp so that the tarp will pull the bows 70 rearwardly along the upper ends of the tracks 52 and 56. When the support 30 reaches the rear end of the body, the motors 36 and 44 will be deactivated with the tarp being in its fully extended position to cover the open end of the box.

When it is desired to retract the tarp 72, the motors 36 and 44 are reversed so that support 31 will move from the rear end of the body towards the front end. As the support 31 moves forward, it will engage the adjacent bow 70 with the tarp and hoses 90 and 92 collapsing between the support 31 and the adjacent bow 70 in an accordion fashion. As the support 31 and the next adjacent bow 70 move forwardly, the tarp will be collapsed between adjacent bows and the bows will be moved to the front of the box adjacent the shield 84 so that the tarp is in its retracted position much like an accordion.

Thus it can be seen that a novel method and means has been provided for tarping a truck or trailer body through the use of hydraulic motors and with a reduced number of parts compared to that of the prior art.

Thus it can be seen that the invention accomplishes at least all of its stated objectives.

I claim:

1. A retractable tarp cover system for a truck body having front and rear ends and first and second sides having upper ends, comprising:

a first elongated track member secured to the upper end of the first side of the truck body which extends between the front and rear ends thereof;

a second elongated track member secured to the upper end of the second side of the truck body which extends between the front and rear ends thereof;

a transversely extending support, having first and second ends, positioned between said first and second track members and extending therebetween;

a first reversible hydraulic motor operatively secured to said first end of said support and having a first driven gear in operative engagement with said first track member;

a second reversible hydraulic motor operatively secured to said second end of said support and having a second driven gear in operative engagement with said second track member;

a plurality of transversely extending spaced-apart tarp bows having first and second ends;

said first ends of said tarp bows being operatively horizontally movably mounted on the upper end of the first side of the truck body in a forwardly and rearwardly direction with respect thereto;

said second ends of said tarp bows being operatively horizontally movably mounted on the upper end of the second side of the truck body in a forwardly and rearwardly direction with respect thereto;

a flexible tarp, having a front end, a rear end, and first and second sides;

said front end of said tarp being fixed in position at the front end of the truck body;

said rear end of said tarp being secured to said support for movement therewith;

said tarp being secured to said tarp bows and extending between the upper ends of the first and second sides of the truck body;

said first and second reversible hydraulic motors, when operated in a first rotational direction, causing said first and second driven gears to rotate in a first direction with respect to said first and second tracks to cause said support to move forwardly along said first and second tracks thereby causing said tarp to retract towards the front end of the truck body;

said first and second reversible hydraulic motors, when operated in a second direction opposite to said first direction, and said tarp is in a retracted position, causing said first and second gears to rotate in a second direction opposite to said first direction with respect to said first and second tracks to cause said support to move rearwardly along said first and second tracks thereby causing said tarp to be extended towards the rear end of the truck body.

2. The system of claim 1 wherein said support comprises a truss member.

3. The system of claim 1 wherein said support comprises a box truss.

4. The system of claim 1 wherein said first and second ends of said support have guides thereon which slidably connect said first and second ends of said support to said first and second tracks, respectively.

5. The system of claim 4 wherein said first and second tracks have outer side edges and wherein said guides are slidably connected to outer side edges of said first and second tracks.

6. The system of claim 5 wherein said guides limit the vertical movement of said support with respect to said first and second tracks.

7. The system of claim 1 wherein said first and second ends of said tarp bows have guides thereon which slidably connect said first and second ends of said tarp bows to said first and second tracks, respectively.

8. The system of claim 7 wherein said first and second tracks have outer side edges and wherein said guides are slidably connected to said outer side edges of said first and second tracks, respectively.

9. The system of claim 8 wherein said guides limit the vertical movement of said tarp bows with respect to said first and second tracks.

10. The system of claim 1 wherein said first and second gears have teeth extending therefrom and wherein said first and second tracks have spaced-apart openings formed therein which receive said teeth of said gears.

* * * * *